United States Patent
Larson et al.

[15] 3,655,104
[45] Apr. 11, 1972

[54] CONSTANT VOLUME DISCHARGE GATE

[72] Inventors: Clarence E. Larson; Richard H. Dawley, both of Columbus, Ohio

[73] Assignee: Martin Masietta Corporation, New York, N.Y.

[22] Filed: May 6, 1970

[21] Appl. No.: 35,219

[52] U.S. Cl............................222/317, 222/342, 222/363
[51] Int. Cl............................................................G01f 11/24
[58] Field of Search.................222/342, 362, 363, 368, 349, 222/317

[56] References Cited

UNITED STATES PATENTS

| | | | |
|---|---|---|---|
| 2,321,869 | 6/1943 | Stanyer | 222/342 |
| 2,428,241 | 9/1947 | Pootves | 222/342 X |
| 1,540,165 | 6/1925 | Cytron | 222/363 X |

FOREIGN PATENTS OR APPLICATIONS

| | | | |
|---|---|---|---|
| 337,622 | 6/1921 | Germany | 222/368 |
| 451,562 | 8/1936 | Great Britain | 222/368 |

*Primary Examiner*—Robert B. Reeves
*Assistant Examiner*—Frederick R. Handren
*Attorney*—John A. Crowley, Jr. and Alvin H. Fritschler

[57] ABSTRACT

A gate assembly for the measurement and discharge of a fixed volume of flowable material has a rotatable inner drum with an opening therein to receive and discharge material as the drum is rotated between a receiving position and a discharge position. This drum is rotatable mounted within an outer drum attached to the bottom portion of a storage container for the flowable material. The outer drum has an inlet opening on its upper surface and a discharge port on its bottom surface. Sealing means prevent the flow of material down the annulus between the inner and outer drums. A wiper bar is positioned within the annulus to prevent the accumulation of material therein as the inner drum moves between its material-receiving and material-discharge position. Means are provided to prevent the flow of material from the storage container so as to permit the gate assembly to be removed while material is stored in the container.

6 Claims, 2 Drawing Figures

Patented April 11, 1972

3,655,104

INVENTOR.
RICHARD H. DAWLEY
CLARENCE E. LARSON

ATTORNEY

CONSTANT VOLUME DISCHARGE GATE

BACKGROUND OF THE INVENTION

Field of the Invention

This invention relates to a material discharge gate assembly. More particularly, it relates to a gate assembly permitting convenient measurement and discharge of a fixed quantity of flowable material from a storage container.

Description of the Prior Art

In a wide variety of applications, flowable materials discharged from storage containers by means of valve or gate assemblies are to be employed in carefully measured quantities alone or in admixture with other materials. In such circumstances, the flowable material is frequently discharged to intermediate weighing equipment so that a fixed quantity may be measured for material batching purposes. The incorporation of such intermediate equipment represents a significant increase in the capital cost of material storage and discharge devices. Operating expenditures are likewise effected by the necessary inclusion of a weighing or measuring step upon discharge of material from the storage container.

On some material discharge valves, rotating vanes have been employed to control the rate at which material flows from the storage container and to prevent the accumulation or plugging of material in the valve so as to impede the discharge of material from the container. Such rotating vanes do not serve to discharge measured quantities of material from the container, and the modification of such vane-containing valves for this purpose would be accompanied by inherent physical and operating difficulties rendering such attempts impractical in comparison with the use of the conventional weighing equipment referred to above. There remains, however, a genuine interest in the art in the development of material discharge gate assemblies that simplify subsequent batching techniques and permit the intermediate weighing or measuring operation to be avoided.

It is an object of the present invention, therefore, to provide an improved material discharge gate assembly.

It is another object to provide an improved gate assembly capable of discharging a measured quantity of material from a storage container.

It is another object of the invention to provide a gate assembly capable of discharging a constant volume of flowable material from a storage container.

It is a further object of the invention to provide a material discharge gate assembly capable of eliminating the need for intermediate weighing equipment in material batching operations.

With these and other objects in mind, the present invention is hereinafter described in detail, the novel features thereof being particularly pointed out in the appended claims.

SUMMARY OF THE INVENTION

The gate assembly of the present invention incorporates a rotatably mounted inner drum adapted for movement between a material-receiving position and a material-discharging position. In its material-receiving position, flowable material from the storage container flows into the inner drum. Upon being filed, the inner drum can easily and quickly be rotated to its material-discharging position in which the flowable material will discharge by gravity flow, after which the drum may be rotated back to its original material-receiving position in which another equal quantity of flowable material will pass downwardly from the storage container to the inner drum of the gate assembly. Since the amount of material that is received by and discharged from the inner drum in each individual operation of the gate assembly of this invention, the material may be discharged from the inner drum directly to material batching or other equipment requiring an input of a measured quantity of material. Intermediate weighing equipment is not required.

The inner drum of the present invention is rotatably mounted within an outer drum that may conveniently be mounted to the bottom portion of a storage container in suitable position so that material flowing from discharge opening of the storage container will pass into said inner drum when the drum is in its material-receiving position. Sealing means are positioned across the annulus between the inner and outer drums to prevent material passing into the gate assembly from flowing downwardly in the annulus to the outer drum discharge port. Variations in the volume of material discharged from the gate assembly can thereby be avoided, so that a carefully measured quantity of material may readily be discharged for use in any given application. The accumulation of material in the annulus during rotation of the inner drum can effectively be prevented by the positioning of a wiper bar on the inner drum in position to wipe any material from the annulus as the inner drum rotates from its material-receiving to its material-discharging position. Free rotation of the inner drum is not impeded by material accumulation, therefore, so the necessity for disassembling the gate assembly for cleaning purposes is minimized.

BRIEF DESCRIPTION OF THE INVENTION

The invention is hereinafter described in further detail with reference to the accompanying drawings in which:

FIG. 1 is a side elevational view of the novel gate assembly of the present invention; and FIG. 2 is an end view, partly in cross section, of the gate assembly of FIG. 1.

DETAILED DESCRIPTION OF THE INVENTION

Figure 1:
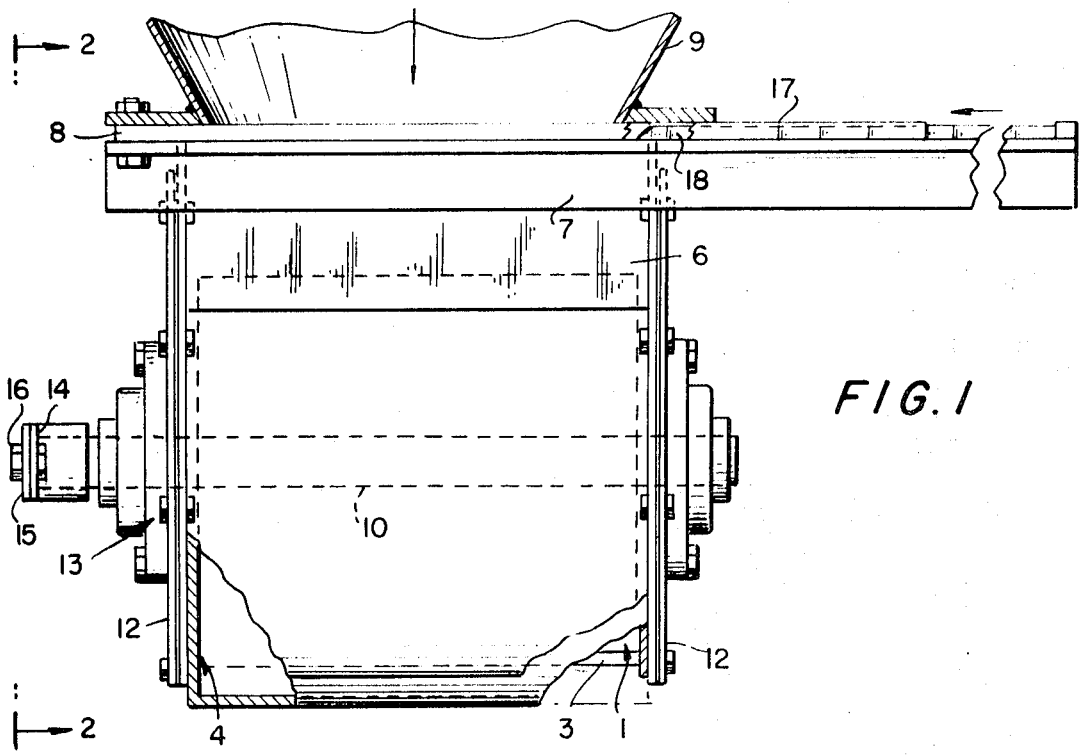

In the drawings, the outer drum of the gate assembly is represented by the numeral 1. This drum has a top or arcuate inlet opening 2 to receive flowable material from a storage container, as from discharge chute 9. Outer drum 1 also has a bottom or arcuate discharge port 3 for discharging material from the gate assembly. Openings 2 and 3 extend lengthwise along the upper and lower surfaces, respectively, of outer drum 1.

Inner drum 4 is rotatably mounted on support shaft 10 for rotation within outer drum 1 between a material-receiving position and a material-discharging position. In its material-receiving position, the arcuate opening 5 extending lengthwise on the surface of inner drum 4 is positioned immediately under inlet opening 2 of outer drum 1 so that material flowing from a storage container through chute 9 and said inlet opening 2 will pass into inner drum 4. When inner drum 4 is in its material-discharging position, opening 5 is positioned in a diametrically opposite position so that material in said inner drum 4 may flow therefrom through discharge port 3 of outer drum 1 for subsequent use.

The gate assembly of this invention may conveniently be attached to the underside of a material storage container by suitable supporting members secured to outer drum 1. In the drawings, supporting legs 6 welded or otherwise secured to outer drum 1 are also secured to support members 7 having attaching brackets 8 connected therewith for bolting or other removable connection to the material storage container or its discharge chute 9. Since outer drum 1 is thus removably secured to the underside of the storage container, the gate assembly may easily be removed from the container, if desired, and can, of course, readily be attached to such a container in the field for control and measurement of the flowable material discharged therefrom.

Figure 2:
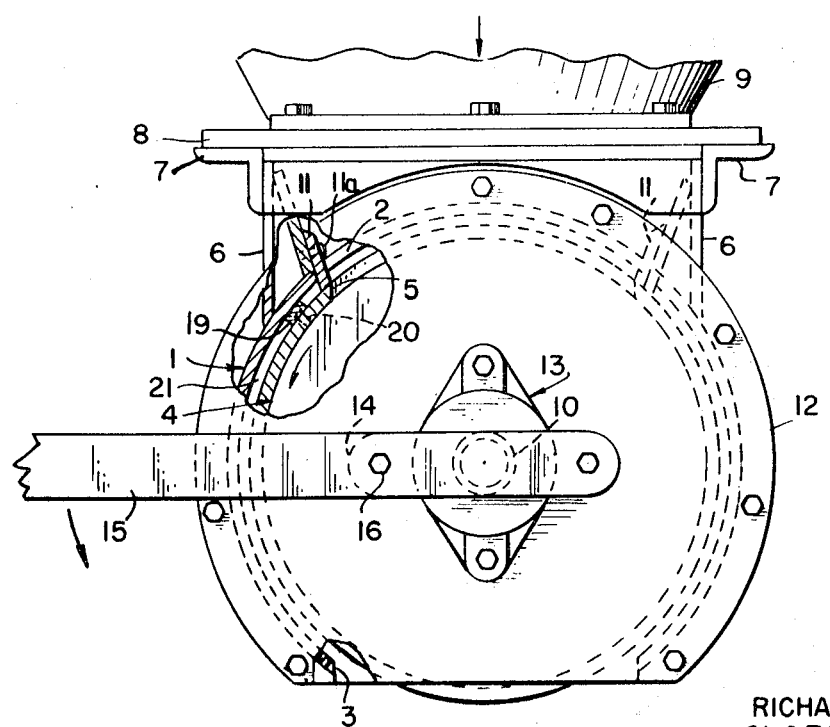

The movement of inner drum 4 between its material-receiving and material-discharging positions is conveniently accomplished by rotation thereof by mechanical means adapted for movement rapidly between fixed points at which said inner drum will be either in material-receiving or material-discharging position. As shown in FIG. 2, inner drum 4 is rotated counter-clockwise from receiving to discharging position and clockwise back to its receiving position. The size of inner drum 4 with relation to that of outer drum 1 is such that the annulus between the drums is sufficient to assure the free rotation of inner drum 4 within outer drum 1. Material entering the gate assembly through inlet opening 2 of outer drum 1 would, unless checked, not only fill inner drum 4 but pass into said annulus, represented by the numeral 21, and downwardly therein to discharge port 3 of outer drum 1. To prevent such undesired flow of material in annulus 21, sealing bars 11, secured to support legs 6 by screws 11a, are positioned across the ends of opening 2 in outer drum 1 in position to establish sealing contact with the exterior surface of inner drum 4, thereby preventing the flow of material into annulus 21. Sealing bars 11 may be of rubber, metal, plastic or any other material capable of forming a sealing contact with inner drum 4 and suitable for use in the environment of the given flowable material application.

Cover plate 12 is secured to the ends of outer drum 1 to stiffen said outer drum, and flange bearings 13 are connected thereto to provide rotatable mounting support for inner drum support shaft 10. Conventional sealing means may be employed to prevent discharging of material from inner drum 4 around the periphery of support shaft 10. Said shaft 10 is extended on one end of the gate assembly so that handle support 14 may be mounted thereon, with dump handle 15 being applied thereto. Mechanical stops, not shown, may be employed so that an operator may operate the gate assembly in a quick and simple manner by moving handle 15 counter-clockwise to one end position with opening 5 of inner drum 4 in its downward, material-discharging position and backward in a clockwise manner to its opposite end position with opening 5 of said inner drum 4 then in its upward, material-receiving position. Handle 15 may conveniently be secured to handle support 14 as by retaining bolts 16.

In some circumstances, it may be desirable to remove the gate assembly from a storage container for routine maintenance or for use elsewhere while flowable material is retained in the container. In the event the container itself has no shut-off mechanism, the flow of material therefrom can be prevented by means of guillotine 18 positioned guillotine guide 17 for horizontal movement across the discharge opening of chute 9. In its closed position, guillotine 18 effectively blocks said opening so that no material can flow from the storage container. When guillotine 18 is slid back in guide 17 to its open position, the discharge opening in chute 9 is uncovered so as to permit the flow of material from the storage container to the gate assembly as heretofore set forth. Guide 17 can be affixed to brackets 8 by ordinary mechanical means.

In the operation of the gate assembly herein described, equal volumes of material will be collected in inner drum 4 each time it is positioned in its image-receiving position. Each movement of dump handle 15 to its discharge position, therefore, will cause a known and measured quantity of material to be discharged from the gate assembly. In rotating inner drum 4 back to its material-receiving position, some of the residual material adhering to the edges of opening 5 in the inner drum may tend to be drawn up into annulus 21 on the side thereof that opening 5 passes during rotation between the material-discharging and material-receiving positions. If such a tendency exists and depending upon the nature of the flowable material being measured and discharged through the gate assembly, such material may tend to accumulate on the interior surface of outer drum 1 in annulus 21. Such accumulation, if allowed to continue, would tend to clog the annulus and interfere with the free rotation of inner drum 4 or to impair the seal preventing the flow of material down annulus 21 in an undesired manner. Additional maintenance and repair may thereby result from such accumulation in annulus 21. In the illustrated embodiment of the invention, any such tendency for material accumulation is minimized by means of wiper bar 19 positioned in the annulus and affixed to inner drum 4 by means of set screws 20. Wiper bar 19 extends along the length of the annulus and may be made of rubber or other suitable material adapted to form wiping contact with the interior surface of outer drum 1 upon rotation of inner drum 4 from its material-receiving position to its material-discharging position. Any material in the annulus will thus be wiped off of the interior surface of outer drum 1 so that inner drum 4 may continue to rotate freely in continued use.

In order to effectively sweep the annulus most completely, wiper bar 19 is positioned near the lead edge of opening 5 in inner drum 4 as the drum is rotated from its material-receiving to its material-discharge position. As shown in FIG. 2, a small space is desirably maintained between wiper bar 19 and sealing bar 11 so that any material that may work itself around bar 19 in annulus 21 may be collected therein and not tend immediately to cause pressure and wear that may ultimately require adjustment or replacement of sealing bar 11 on that side of the gate assembly.

It will be appreciated that various changes and modifications can be made in the gate assembly herein described and illustrated without departing from the scope of the invention as claimed. As an example, the individual lengthwise openings in the inner and outer drums can be replaced by a series of openings, if desired, along the length of the gate assembly although the unitary openings disclosed seem generally preferable from the point of view of convenience and trouble-free operation.

Any flowable material may be measured and discharged by means of the novel gate assembly of this invention, including solids, liquids, slurries, etc. The invention has been found highly advantageous for use in conjunction with onsite storage containers for granular materials and portable storage bins for concrete, cement, mortar mixes and similar flowable materials frequently employed in material batching operations. Since each operating sequence of the gate assembly results in the discharge of a constant volume of material from the storage container, the need heretofore encountered for employing weighing or measuring equipment subsequent to discharge from the storage container is obviated, resulting in a significant savings in capital cost and operating expenditures in batching processes and other applications requiring the use of flowable materials in constant and measurable quantities:

Therefore, I claim:

1. An improved gate assembly apparatus adapted for the measurement and discharge of a fixed volume of flowable material from a storage container comprising:

a. a cylindrical outer drum having its longitudinal axis extending in a generally horizontal plane, said outer drum having an arcuate inlet opening extending lengthwise on its upper surface to receive said flowable material from a storage container and an arcuate discharge port extending lengthwise on its bottom surface for discharge of said material from the gate assembly;

b. mechanical means for securing said outer drum to the bottom portion of a storage container having a discharge opening in the bottom portion thereof;

c. a rotatably mounted cylindrical inner drum positioned inside said outer drum, said inner drum having an arcuate opening on the surface thereof to receive said flowable material when said opening is in a material-receiving position immediately under said outer drum inlet opening and adapted to discharge said material when said inner drum is rotated so that said opening is in a material-discharging position immediately over said outer drum discharge port, the annulus between said inner and outer drums being sufficient to assure the free rotation of said inner drum within the outer drum;

d. mechanical means for supporting said rotatable inner drum within said outer drum;

e. mechanical means for rotating said inner drum within said outer drum between said material-receiving position and said material-discharging position, said means providing for the rotation of the inner drum in a counter-clockwise direction from one said position to the other and in a clockwise direction back to said first position;

f. sealing means positioned in a stationary manner across the annulus between the inner and outer drums along the length of each side of the arcuate inlet opening in said outer drum and adapted to provide sealing contact with the outer surface of said inner drum to prevent material passing through the inlet opening of said outer drum from flowing into the annulus between said inner and outer drums and downwardly therein to the outer drum discharge port when said inner drum is in its material-receiving position and its material-discharging position; and g. a wiper bar position in said annulus on the side thereof past which the opening in the inner drum travels as said inner drum is rotated from its material-receiving to its material-discharging position, said wiper bar extending along the length of said annulus and being adapted to move therein ahead of said opening in the inner drum so as to wipe material adhering to the surface of said outer drum, thus preventing the accumulation of material in the annulus to the point of interfering with the free rotation of said inner drum, whereby a measured volume of flowable material may be charged to the inner drum when said drum is in its material-receiving position and said charge of material may readily be discharged therefrom by rotating said drum to its material-discharging position, thereby avoiding the necessity for employing weighing equipment subsequent to the discharge of material from the container discharge gate for material batching purposes.

2. The apparatus of claim 1 and including mechanical means for securing said wiper bar to said inner drum.

3. The apparatus of claim 1 in which said wiper bar is positioned so that a small air space separates said bar from the sealing member on the same side of the annulus when said inner drum is positioned in its material-receiving position, thus providing space for material working past said wiper bar to accumulate in said annulus without being forced past said sealing member and impairing the effectiveness thereof.

4. The apparatus of claim 3 and including mechanical means for securing the wiping bar to said inner drum.

5. The apparatus of claim 4 and including a material storage container having a discharge opening positioned so as to discharge flowable material into said gate assembly when said inner drum thereof is in a material-receiving position.

6. The apparatus of claim 5 and including mechanical means for preventing the flow of material from said storage container to the inlet opening of said outer drum so as to permit said gate assembly to be removed from said storage container while flowable material is retained therein.

* * * * *

UNITED STATES PATENT OFFICE
CERTIFICATE OF CORRECTION

Patent No. 3,655,104                    Dated April 11, 1972

Inventor(s) Clarence E. Larson and Richard H. Dawley

It is certified that error appears in the above-identified patent and that said Letters Patent are hereby corrected as shown below:

"Assignee: Martin Masietta Corporation" should be
-- Assignee: Martin Marietta Corporation --.

Under "ABSTRACT" - line 5, "rotatable" should be -- rotatably --.

Column 5, line 9, "position" should be -- positioned --.

Signed and sealed this 5th day of December 1972.

(SEAL)
Attest:

EDWARD M. FLETCHER, JR.                ROBERT GOTTSCHALK
Attesting Officer                      Commissioner of Patents